Dec. 8, 1931. O. H. PIEPER 1,835,961
DENTAL HANDPIECE
Filed April 17, 1930 2 Sheets-Sheet 1
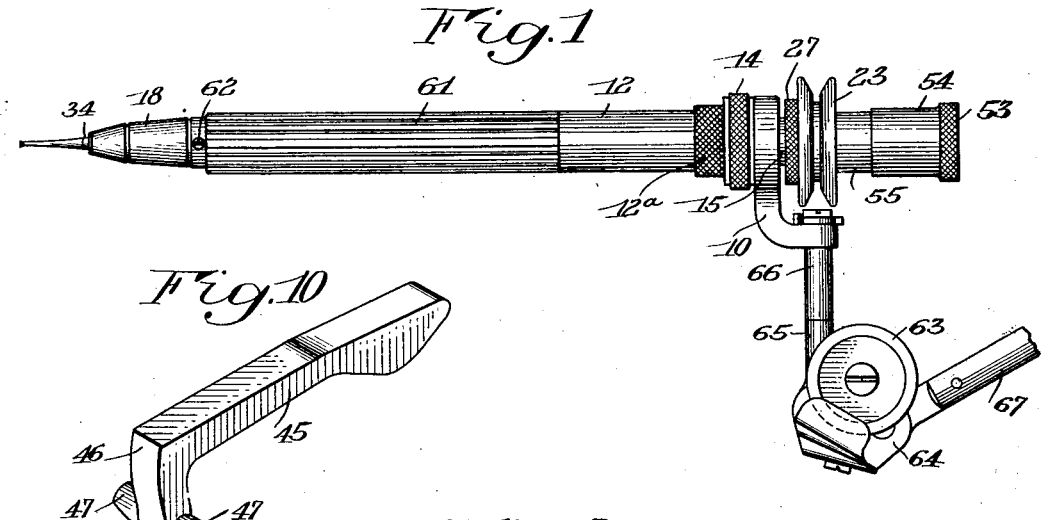
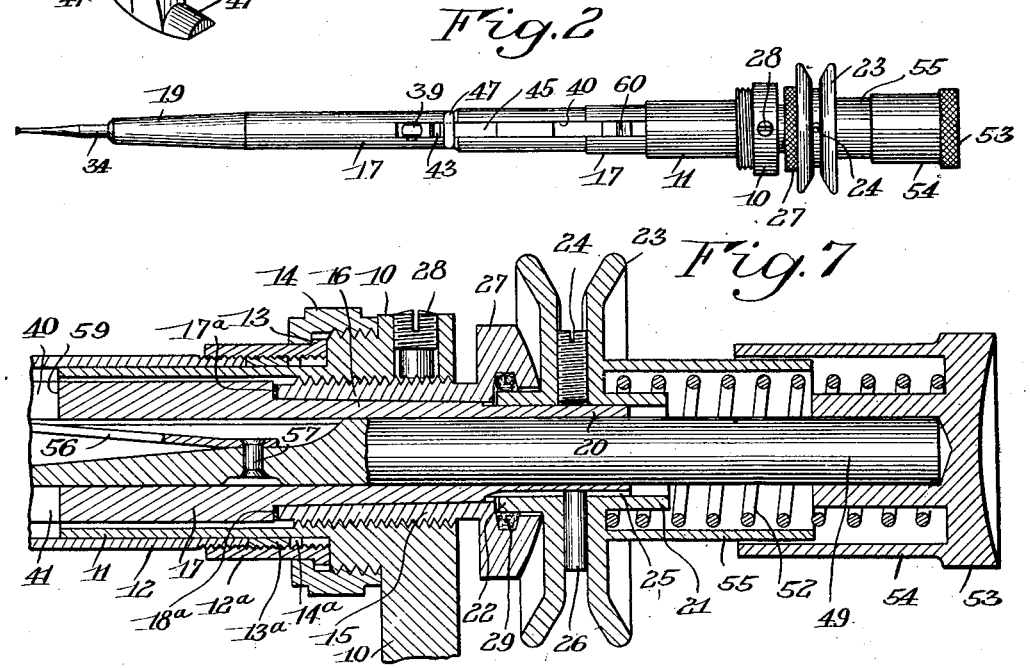
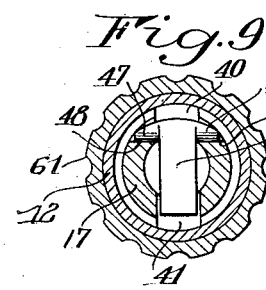 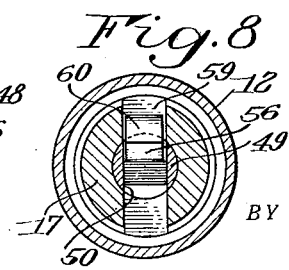
INVENTOR
Oscar H. Pieper
BY Edward H. Cumpston
his ATTORNEY

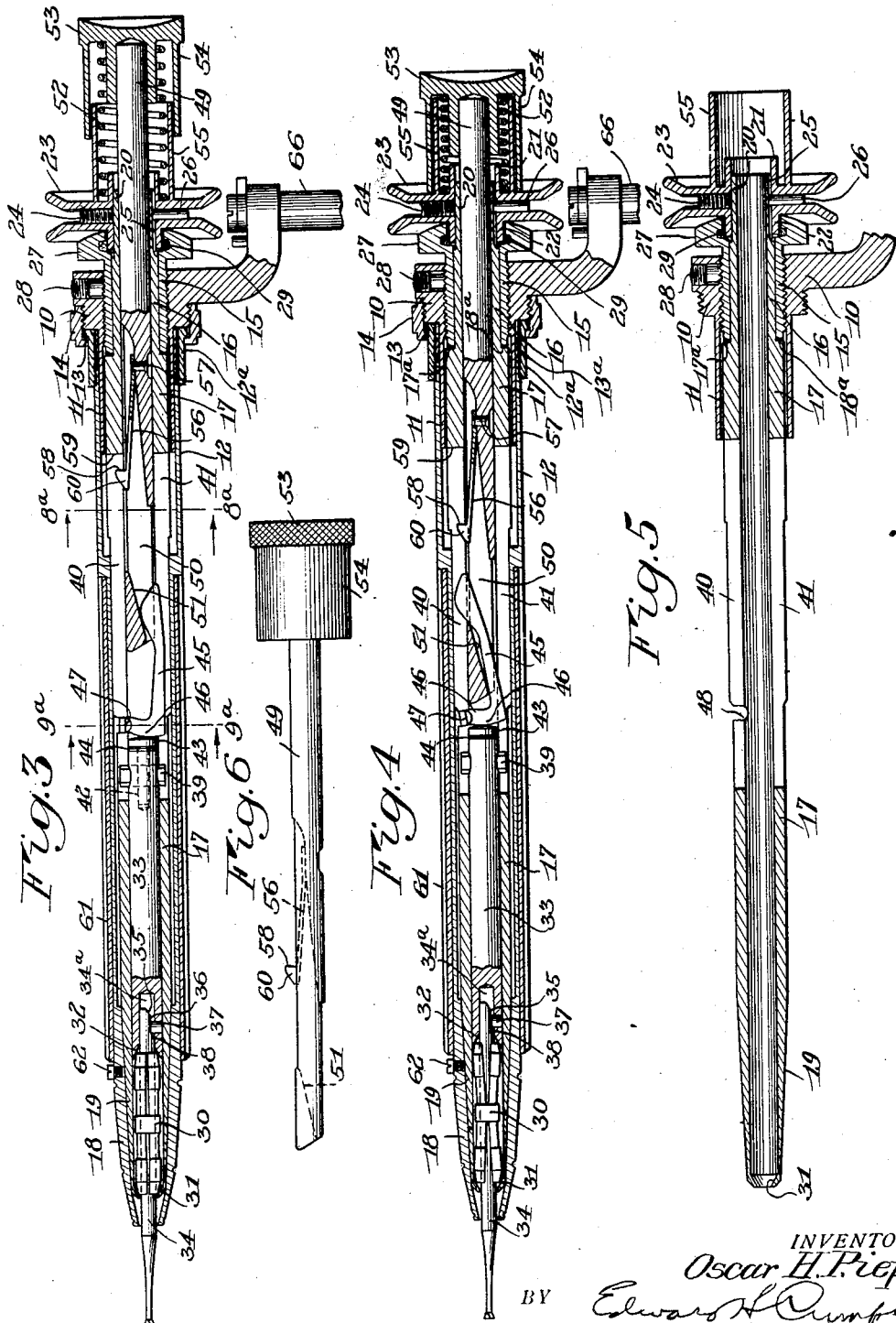

Patented Dec. 8, 1931

1,835,961

UNITED STATES PATENT OFFICE

OSCAR H. PIEPER, OF ROCHESTER, NEW YORK

DENTAL HANDPIECE

Application filed April 17, 1930. Serial No. 444,894.

The present invention relates to dental apparatus, and more particularly to a dental hand piece of the type designed for the use of tools of different kinds for operation upon the teeth, one object being to provide an improved instrument of this class which is efficient in service, convenient to operate, and one in which the parts can be quickly and easily assembled to afford a complete instrument.

A further object of the invention is to provide in an instrument of this type improved tool driving means together with improvements in the control and operating parts therefor, along with other improvements which effect economies in manufacture, and which insure a practical and simplified construction.

To these and other ends the invention resides in certain improvements and combinations of parts, all as will be hereafter more fully disclosed, the novel features being pointed out in the claims at the end of the specification.

In the drawings:

Fig. 1 is a side view illustrating one embodiment of the invention;

Fig. 2 is a view showing the spindle and operating parts from which the casing has been removed;

Fig. 3 is a longitudinal central section through the instrument, drawn to an enlarged scale and showing the parts in normal operating position;

Fig. 4 is a similar view with the parts moved to position to effect release of the chuck;

Fig. 5 is a longitudinal section through the supporting head and spindle with the chuck and control parts therefor removed;

Fig. 6 is a detail view of the plunger and associated parts for controlling the clutch operating means;

Fig. 7 is an enlarged fragmentary section through the end of the instrument carrying the driving pulley and showing the relationship of the various parts thereof;

Fig. 8 is an enlarged transverse section taken on line 8a—8a of Fig. 3;

Fig. 9 is an enlarged transverse section taken on the line 9a—9a of Fig. 3, and

Fig. 10 is a detail perspective view of one of the operating parts for moving the chuck to closed position.

Similar reference numerals throughout the several views indicate the same parts.

The present invention embodies a dental instrument of the class generally known as a dental hand piece in which there are various operating and control parts for the different drilling, cutting, and polishing tools employed in various operations on the teeth. In the present embodiment of the invention, improvements have been made relating to various parts of the construction, such as an improved and positive drive for the tool, along with means by which proper adjustment between different operating parts may be readily effected, and other improvements, certain of which facilitate assembling and detachment of a number of the elements going to make up the complete instrument.

Referring to the drawings 10 represents the usual wrist joint frame or head piece having a projecting sleeve 11 fitted within the rear end of the body of a casing comprising the front and rear sections 12 and 12a, the latter being in the form of a coupling flanged at 13 for engagement by a hollow nut 14 secured upon the head and connecting the coupling therewith. Threaded within the coupling is a member 13a having notches 14a for receiving a suitable tool to be employed for rotating said member to vary the effective length of the casing for a purpose which will appear hereinafter, it being understood that said member forms a stop for the casing section 12 when the latter is screwed into the coupling. Threaded within the frame 10 is a bearing member 15 forming a continuation of the casing in which is journaled the reduced end portion 16 of a hollow spindle 17, said spindle having a shoulder 17a abutting a spacing member 18a on the end of the bearing member, the latter projecting within the sleeve 11 of the head piece. At the tool holding end of the instrument the casing is provided with a tapered bearing portion 18 in which is journaled the correspondingly tapered portion 19 of the tool carrying end of the spindle. The frame 10 and the casing with its bearings afford a rigid support or mounting for the spindle and permit the latter to freely rotate therein. The rear end of the spindle is extended through the bearing member 15 and is preferably reduced at 20 at which point it receives the oppositely disposed bearing sleeves 21 and 22 of the spindle driving pulley 23, secured to said reduced portion by a clamping screw 24, the sleeve portion 22 being slightly spaced from the bearing member 15 to permit of a limited movement of the spindle within the bearing member. The reduced portion 20 is slotted at 25 to receive the inner end of a driving pin 26 inserted within a bore formed in the wall of the pulley, the pin being preferably anchored by forcing it into the bore under considerable pressure. By loosening the clamping screw 24 the pulley may be adjusted longitudinally of the spindle when desired without having to remove the driving pin.

The bearing 15 is provided with a knurled head 27 by which it may be rotated to adjust it to the desired position within the head 10, the bearing being held in adjusted position preferably by a set screw 28. The head 27 is recessed to receive the sleeve portion 22 of the pulley, which rotates therein, said sleeve portion being surrounded by a ring 29 of felt or other suitable material positioned within the head and which is saturated with oil or other suitable lubricating material, whereby to properly lubricate the bearing and the spindle therein.

Disposed within the forward end portion 19 of the spindle is a suitable tool clamping device 30, which preferably comprises a spring jawed chuck of a well known type, the extremities of the jaws being beveled for cooperation at one end with a beveled bearing portion 31 of the spindle permanently fixed thereon and at the opposite end for cooperation with the beveled portion 32 of a follower or chuck closing member 33 slidably mounted within the bore of the spindle. The shank of the tool or cutting implement 34 is gripped and held by the jaws of the chuck when the follower 33 is forced outwardly to the position shown in Fig. 3. The follower is provided with a socket or recessed portion 34a arranged to receive the inner end of the tool shank, the latter being beveled at 35 to facilitate its entrance within the socket. In order to afford a positive driving connection between the follower and the tool, the latter is provided with an abutment 36 arranged to receive a driving lug or abutment 37 on the follower, preferably in the form of a stud suitably anchored within the surrounding wall of the recess 34a. The abutment 36 is preferably formed by providing a flattened portion on the inner end of the tool at one side thereof. Longitudinal movement of the tool inwardly of the spindle is limited through engagement of a shoulder 38 thereon with the lug 37 of the follower. While the driving connection between the follower and tool just described constitutes one method of connecting these parts, it will be understood that this means may be modified if desired, and any preferred form of construction employed for this purpose. With a positive drive of this kind, the function of the chuck is merely that of holding the tool against displacement, the chuck being relieved of the tendency of the tool to shift longitudinally therein under the pressure exerted on the operating end of the tool while in service which is taken by the shoulder 38 in engagement with the lug 37.

Rotation of the follower with the spindle is effected by a driving element 39 extending through the rear end of the follower and having its end portions projecting into the longitudinally extending slots 40 and 41 formed in opposite sides of the spindle for a portion of its length. The wall portions at the opposite sides of the slots form abutments for engaging the ends of the driving element, so that the follower and spindle always operate together. The driving element is detachably held within the follower by a pin 42 slidably mounted within the end of the follower and extending through the driving element, the pin having a head 43 between which and the follower are disposed one or more shims or spacing elements 44 provided for a purpose which will appear hereinafter.

An actuating member for moving the follower outwardly within the spindle to close the chuck preferably comprises a lever 45 mounted to swing within the spindle. The actuating element has a transverse end portion 46 for engagement with the head 43 of the follower, said portion having laterally extending trunnion-like members 47 which are rounded at one side and positioned within bearings 48 formed in the side walls of the slot 40 in the spindle. The longitudinally extending part of the lever lies opposite and is free to move within the slot 41 to the operating and release positions indicated respectively in Figs. 3 and 4.

The shims 44 interposed between the body of the follower and the head 43 of the pin provide for a very fine adjustment of the effective length of the follower in order that it may have the exact amount of movement required to properly close the clutch, while at the same time preventing undue movement of the lever. Furthermore, the thickness or number of the shims can be varied from time to time to compensate for the wear of the parts, so that the adjustment may be properly maintained under all conditions of operation.

The operating means for the lever is of unitary construction and embodies a plunger 49 slidably mounted in the spindle, the plunger being slotted at 50 to receive the longitudinally extending portion of the lever. The plunger on its forward end is provided with a cam or inclined portion 51 adapted when the plunger moves outwardly to the position shown in Fig. 3 to engage the free end of the lever, whereby to operate the lever for the purpose of moving the follower to chuck closing position. The plunger is held in the normal operating position shown in Fig. 3 by means of a spring 52, one end of which engages the head or thumb piece 53 to which the plunger is suitably connected. The other end of the spring engages the pulley which is fixed to the hollow spindle so that the spring tends to constantly urge the follower in a direction away from the tool holding end of the instrument. In order to effect release of the tool holding chuck, it is only necessary to depress the plunger to the position shown in Fig. 4, in which position the tool may be readily withdrawn from the chuck and another inserted therein if desired. Upon release of the thumb piece 53, the spring will immediately return the plunger to the normal operating position shown in Fig. 3, thus causing the cam 51 to swing the lever into position to force the follower into engagement with the jaws of the chuck. The thumb piece 53 is provided with a sleeve 54 cooperating with a similar member 55 on the pulley to conceal the spring in whatever position the plunger may occupy within the spindle. The inward movement of the plunger is preferably limited by engagement of the sleeve 54 with the pulley when the parts are in the position shown in Fig. 4.

Guard means is provided for limiting the outward movement of the plunger when applying the lever 45 which is done before the spindle is inserted within the casing. This means preferably comprises a leaf spring 56 having one end suitably secured to the plunger, as by means of a rivet 57, and the opposite end provided with a lug or holding part 58 arranged to engage a shoulder or abutment 59 on the spindle when the plunger is free to move outwardly under the action of the spring 52. By limiting the outward movement of the plunger in this manner it is held against undue displacement within the spindle by the action of the spring when inserting or removing the lever from the spindle and also when applying or removing the detachable parts associated with the rear end of the follower. On the other hand the plunger and its cam 51 may be readily withdrawn together with the guard 56 by first depressing the latter by means of a suitable tool inserted through the slot 40 to release said guard. Furthermore, on inserting the plunger within the spindle and moving it inwardly the guard will be automatically depressed through engagement of the beveled portion 60 thereof with the end of the spindle and as soon as the lug 58 of the spring reaches the slot 40 it will spring into the latter, as shown in Fig. 3. It will be seen, therefore, that the complete operating means for the lever may be inserted within and withdrawn from the spindle without removal of the latter from the frame or any of the parts connecting it thereto. Furthermore, after removing the plunger and withdrawing the lever through the slot 40 and detaching the driving element 39 from the follower the latter, together with the chuck, can be easily discharged through the rear end of the spindle with which the pulley is connected. By providing for the insertion and removal of the parts in this manner the assembling and repair operations are greatly facilitated and the expense incident to the time consumed and the labor costs are considerably reduced. It will be understood that the lever, the driving element 39, the pin 43, and the shims 44 will be applied before inserting the spindle within the casing. The casing is preferably provided with a detachable sleeve 61 of fluted construction to afford a suitable hand grip for the instrument, the same being held against outward movement by a set screw 62 threaded within the bearing portion 18 of the casing.

The front bearing 31 of the spindle on which the forward end of the chuck rests is positively fixed with respect to the body of the spindle and the chuck therefore will always occupy the same position within the spindle, thus insuring proper relationship between the chuck and the remaining tool operating parts. The pivot bearings 48 of the lever are also fixed with relation to the front bearing of the chuck and the lever therefor has a fixed position with respect to the chuck. Any adjustment which may become necessary by reason of slight variations in the dimensions of these parts either when new or after they have become worn may be readily compensated for by varying the thickness or number of the shims 44 disposed between the follower and the head of the pin therein on which the lever rests.

The object in making the detachable sleeves in two sections is to permit its effective length to be varied when desired. In supplying these instruments to the dental profession several extra sleeves may be furnished with each complete instrument in order to permit of frequent sterilizing of these parts which form the hand grips by which the instruments are held. It will be understood that while the instrument with one hand grip is in use the other hand grips can be sterilized and made ready for service when needed, so that if preferred separate hand grips may be used for each patient to be treated. In the process of manufacture, these parts may vary slightly in length. It is important, however, that they should be accurately fitted to the spindle bearings and the dentist or other operator using the instrument can in applying the sleeve to the spindle, readily tell whether or not it is properly adjusted for length. If it is found that the sleeve is slightly too long or too short the correct adjustment may be effected by the use of a suitable tool employed to rotate the member 13a either to move it inwardly or outwardly as the conditions may require. By then screwing the section 12 within the coupling 12a until it abuts said member the adjustment is completed and the casing may then be applied by inserting it in position and securing the same to the head by screwing up the nut 14. In doing this the forward bearing 18 of the sleeve due to the thrust on the spindle, will cause the latter to become properly positioned with respect to the bearing member 15 so that longitudinal movement of the spindle within the casing is prevented.

The driving belt for the pulley 23, not shown, is carried around a pair of guide pulleys 63, only one of which is shown. The pulleys 63 are mounted on a head 64 pivotally connected with the outer end of an arm 65 having a reduced portion journaled in a sleeve bearing 66 secured upon and extending from the frame 10, Fig. 1, the head being also connected with an arm section 67 supported by a well known form of construction, not shown.

I claim:

1. A dental hand piece comprising a support, a spindle mounted for rotation within the support, a tool holding chuck in the forward end of the spindle, a follower within the spindle for closing the chuck arranged to be driven by the spindle, the follower having an abutment fixed thereon and independent of the spindle arranged for engagement with an butment on the rear end of the tool whereby to positively drive the tool upon rotation of the follower, and operating means for moving the follower longitudinally within the spindle to chuck closing position.

2. A dental hand piece comprising a casing, a spindle mounted for rotation within the casing, a tool mounted within one end of the spindle, a clamping device for the tool disposed within said spindle end, a member located within the spindle arranged to be driven thereby and movable to a predetermined position to urge the clamping device in engagement with the tool, said member having a part independent of the spindle arranged to engage and positively drive the tool, and spring actuated operating means for said member serving to hold it in said predetermined position.

3. A dental hand piece comprising a casing, a spindle mounted for rotation within the casing, a chuck mounted within one end of the spindle, a tool extending through the chuck, a follower mounted within the spindle arranged to be driven thereby and to be moved into position to cause the chuck to grip the tool, said follower having a receiving portion for the inner end of the tool provided with an offset driving member independent of the spindle and constructed to engage and positively drive the tool upon rotation of the spindle and relatively movable parts associated with the spindle for holding the follower in said position.

4. A dental hand piece comprising a casing, a spindle mounted for rotation within the casing, a chuck in one end of the spindle for holding a tool to be inserted within the chuck with its opposite ends projecting therefrom, a follower arranged to be driven by and movable longitudinally within the spindle to close the chuck, said follower having a recess therein for receiving the inner end of the tool and having a part thereon independent of the spindle arranged for cooperation with an abutment formed on said inner end whereby to positively drive the tool, relatively movable operating parts for the follower and spring means for moving said parts to move the follower to chuck closing position.

5. A dental hand piece comprising a support, a spindle mounted for rotation within the support, a tool holding chuck in the forward end of the spindle, a follower within the spindle for closing the chuck arranged to be driven by the spindle, the follower having its forward end recessed in rear of the chuck to receive the rear end of a tool having thereon a shoulder and an abutment, a lug on the follower mounted independently of the spindle and projecting into the recess arranged to be engaged by the shoulder of the tool to limit inward movement of the latter, the lug cooperating with the abutment on the tool whereby to positively drive the tool upon rotation of the follower, and operating means for moving the follower longitudinally within the spindle to chuck closing position.

6. A dental hand piece comprising a casing, a spindle mounted for rotation within the casing and provided with an abutment, a tool holding chuck within one end of the spindle, a follower for closing the chuck movable within the spindle and comprising relatively movable parts, one of which is slidable longitudinally of the other, one or more spaced members interposed between said parts to effect a variation in the length of the follower, a driving element for the follower projecting laterally therefrom into engagement with the abutment and movable with the follower upon the abutment and relative to the spindle and means including relatively movable parts within the casing for moving the follower to chuck closing position.

7. A dental hand piece comprising a casing, a hollow spindle mounted for rotation within the casing and having a recess in its wall, a tool holding chuck disposed within one end of the spindle, a follower for operating the chuck movable within the spindle and comprising relatively movable parts one of which includes a portion slidably mounted within the other part and having a head thereon, one or more spaced members interposed between said head and the part in which said portion is mounted whereby to vary the effective length of the follower, driving means for the follower projecting therefrom into said recess and movable with the follower longitudinally of the spindle, an operating member for the follower extending within the spindle arranged to engage said head and to move the follower to chuck closing position, and releasable means for holding the operating member in position to urge the follower in engagement with the chuck.

8. A dental hand piece comprising a casing, a spindle mounted for rotation within the casing, a tool holding chuck disposed within one end of the spindle, a follower for closing the chuck slidably mounted within the spindle and comprising inner and outer parts movable one relative to another, a driving member for the follower secured upon one of said parts by the other, said driving member extending into engagement with the spindle and arranged to be driven thereby, and operating means for moving the follower to chuck closing position.

9. A dental hand piece comprising a casing, a spindle provided with a longitudinally extending bore, said spindle being mounted for rotation within the casing and having an abutment at one side of the bore, a tool holding chuck disposed within one end of the spindle, a follower movable within the spindle to close the chuck, a driving element for the follower projecting therefrom into engagement with said abutment whereby upon rotation of the spindle said element will operate to drive the follower, an operating member within the bore of the spindle for effecting longitudinal movement of the follower therein, and a plunger within the spindle projecting from the rear end thereof arranged to move said operating member to effect movement of the follower.

10. A dental hand piece comprising a casing, a spindle mounted for rotation within the casing and having an abutment formed thereon, a tool holding chuck disposed within one end of the spindle, a follower slidably mounted within the spindle to engage and close the chuck, a driving element for the follower mounted within a recess formed therein and projecting laterally therefrom into engagement with said abutment for operation thereby, said driving element having an opening therein, a securing member for said element disposed within a recessed portion of the follower and projecting into the opening of the driving element to secure the latter upon the follower, an operating member for the follower having a part arranged to engage said securing member to actuate the latter whereby to move the follower to chuck closing position and actuating means for the operating member.

11. A dental hand piece comprising a support, a hollow spindle journaled in the support, a tool holding chuck in the forward end of the spindle, operating means for the chuck disposed within the spindle, a plunger within the rear end of the spindle for actuating said means, and a spring actuated guard within the spindle arranged for cooperation therewith to hold the plunger against removal therefrom, said guard being movable to a position within the spindle at which it will free the plunger for removal through the rear end of the spindle.

12. A dental hand piece comprising a support, a hollow spindle journaled in the support, a tool holding chuck in the forward end of the spindle, operating means for the chuck disposed within the spindle, a plunger within the rear end of the spindle for actuating said means, a spring within the spindle secured to the plunger and movable therewith, said spring having a part projecting into a slot formed within the spindle and arranged in a predetermined position of the plunger to cooperate with the spindle whereby to hold the plunger against removal therefrom, said spring being movable to a position to permit withdrawal of the plunger from the spindle.

13. A dental hand piece comprising a support, a hollow spindle journaled in the support, a tool holding chuck in the forward end of the spindle, actuating means for the chuck including relatively movable parts within the spindle and a plunger within the spindle having a portion for operating one of said parts, the plunger and said portion being free to slide within the spindle during operation of said actuating means and removable as a unit through the rear end of the spindle.

14. A dental hand piece comprising a support, a hollow spindle journaled in the support, a tool holding chuck in the forward end of the spindle, a follower within the spindle for closing the chuck, an operating element for the follower movable relative thereto, a plunger in the rear end of the spindle having an actuating part thereon for said operating element, said plunger and said follower and chuck being removable through the rear end of the spindle and spring means for holding the plunger in position to maintain the actuating part in operative engagement with the follower operating element.

15. A dental hand piece comprising a support, a hollow spindle rotatably mounted within the support, a tool holding chuck in the forward end of the spindle, operating means within the spindle for closing the chuck, a plunger within the rear end of the spindle for actuating said operating means, and an adjustable guard interposed between the spindle and plunger arranged when the plunger is in a predetermined position within the spindle to check outward movement of the plunger, said guard being releasable to permit its withdrawal together with the plunger as a unit through the rear end of the spindle.

16. A dental hand piece comprising a support, a casing having one end connected to the support, and the other spaced therefrom, a hollow spindle having its forward end journaled in the last mentioned end of the casing and its rear end journaled in the support, a tool holding chuck within the forward end of the spindle, a follower movable within the spindle to close the chuck, an actuating element for the follower mounted to swing within the spindle into position to move the follower to chuck closing position, control means for said actuating member comprising a plunger mounted within the rear end of the spindle and having an operating part arranged when the plunger is moved in a direction away from the follower to a predetermined position to swing said actuating element into operative engagement with said follower, said plunger and operating part being removable as a unit from the rear end of the spindle, and spring means normally operating to hold the plunger in said predetermined position, movement of the plunger from said position in the direction of the follower serving to release the actuating element.

17. A dental hand piece comprising a head, a hollow spindle having one end journaled in the head, an operating member for the spindle connected therewith, a casing for the spindle in which the forward end of the latter is journaled, said casing comprising connected sections adjustable one longitudinally of the other to vary the effective length of the casing, means detachably connecting the casing with the head, a tool holding chuck within the spindle, a chuck closing device movable within the spindle, operating means for said chuck closing device comprising a lever pivoted within the spindle, a plunger within the spindle removable through the rear end thereof, yieldable means normally serving to hold the plunger in position to maintain the lever in operative engagement with the chuck closing device and a guard for holding the plunger against removal from the spindle.

18. A dental hand piece comprising a head, a bearing supported by the head, a hollow spindle projecting through the head journaled in the bearing and held thereby against rearward longitudinal movement, a casing for the spindle having a bearing therefor serving to hold the spindle against forward movement longitudinally of the casing, said casing comprising connected sections adjustable one longitudinally of the other, a member threadedly engaging one of said sections and forming an abutment for engagement by one extremity of the other section whereby to regulate the effective length of the casing by varying the spacing of the said bearings, means detachably connecting the casing with the head, a tool holding chuck within the spindle, operating means for the chuck movable within the spindle including a plunger projecting through the rear end of the spindle and means yieldably holding the plunger in normal operating position.

19. A dental hand piece comprising a support, a casing having one end connected to the support and the other spaced therefrom, a hollow spindle having its forward end journaled in the last mentioned end of the casing and its rear end journaled in the support, a tool holding chuck within the forward end of the spindle, a follower movable within the spindle to close the chuck, an actuating element for the follower mounted to swing within the spindle into position to move the follower to chuck closing position, control means for said actuating member comprising a plunger mounted within the rear end of the spindle and having an operating part arranged when the plunger is moved in a direction away from the follower to a predetermined position to swing said actuating element into operative engagement with said follower and a releasable guard on the plunger arranged to cooperate with a portion of the spindle to limit movement of the plunger in a direction away from the follower.

20. A dental hand piece comprising a head, a casing connected with the head, a hollow spindle within the casing having its forward end journaled in the front end of the casing and its rear end extending through and journaled in the head, a driving member connected with the spindle in rear of the head, a tool holding chuck in the forward end of the spindle, a follower for operating the chuck located within the spindle, a lever within the spindle for operating the follower, a plunger within the spindle having its forward end operatively engaging the lever and its rear end projecting through the head and the driving member on the spindle, said plunger including the lever engaging portion thereof being constructed for removal as a unit through the rear end of the spindle, and yieldable means serving to hold the plunger in operative engagement with the lever.

21. A dental hand piece comprising a head, a casing connected with the head, a hollow spindle within the casing having its forward end journaled in the front end of the casing and its rear end extending through and journaled in the head, a driving member connected with the spindle in rear of the head, a tool holding chuck in the forward end of the spindle, a follower for operating the chuck located within the spindle, a lever within the spindle for operating the follower, a plunger within the spindle having its forward end operatively engaging the lever and its rear end projecting through the head and the driving member on the spindle, said plunger including the lever engaging portion thereof being constructed for removal as a unit through the rear end of the spindle, an adjustable guard on the plunger arranged in normal position to cooperate with the spindle to prevent withdrawal of the plunger, said guard in another position being removable with the plunger as a unit from the spindle, and yieldable means serving to hold the plunger in operative engagement with the lever.

OSCAR H. PIEPER.